O. F. KADOW.
COMBINED FILTER AND SEDIMENT TRAP.
APPLICATION FILED JUNE 14, 1906.

1,075,576.

Patented Oct. 14, 1913.

WITNESSES:
Brennan B West
G. H. Myers.

INVENTOR,
Otto F. Kadow
BY
Fouts & Hull
ATTORNEYS.

UNITED STATES PATENT OFFICE.

OTTO F. KADOW, OF CLEVELAND, OHIO, ASSIGNOR OF ONE-THIRD TO JOHN B. HULL AND ONE-THIRD TO HAROLD E. SMITH, BOTH OF CLEVELAND, OHIO.

COMBINED FILTER AND SEDIMENT-TRAP.

1,075,576.

Specification of Letters Patent.

Patented Oct. 14, 1913.

Application filed June 14, 1906. Serial No. 321,596.

*To all whom it may concern:*

Be it known that I, OTTO F. KADOW, residing at Cleveland, in the county of Cuyahoga and State of Ohio, have invented a certain new and useful Improvement in Combined Filters and Sediment-Traps, of which the following is a full, clear, and exact description, reference being had to the accompanying drawings.

My invention relates to sediment traps and filters for use in water supply pipes and systems. In the practical operation of such traps and filters, it is important that means shall be provided for preventing sediment from flowing into the particular system or supply with which the trap may be used. To accomplish this end, screens have been interposed between the inlets and outlets of traps, but such screens, even though of fine mesh, are incapable of preventing much of the sediment from passing through the outlets, owing to the fact that the water in the bodies of the traps is kept in circulation while the current is flowing therethrough, such circulation resulting in disintegrating the sediment and reducing part of the same to such fine consistency as to permit it to pass through the screens with the water current. Furthermore, the repeated and continuous agitation of the water in the bodies of the traps slowly dissolves the difficultly soluble matter in the water, with the result that the water which passes through the outlets is necessarily more or less contaminated, both by reason of the finely divided matter held in suspension therein and by reason of the presence of soluble materials therein which, but for the agitation in the traps, would not be so dissolved.

The object of my invention is to provide a trap which is free from the objections above noted, which will provide an effective dead-water space for the reception of sediment, and which will be simple of construction and economical of production.

Generally speaking, the invention may be defined as consisting of the combinations of elements embodied in the claims hereto annexed.

Figure 1:
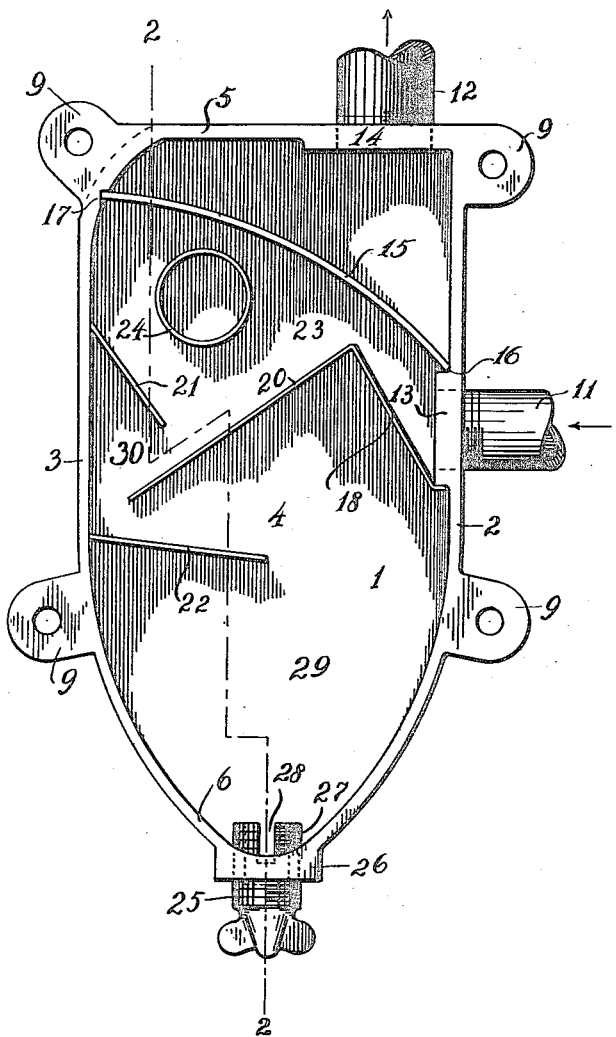
Figure 2:
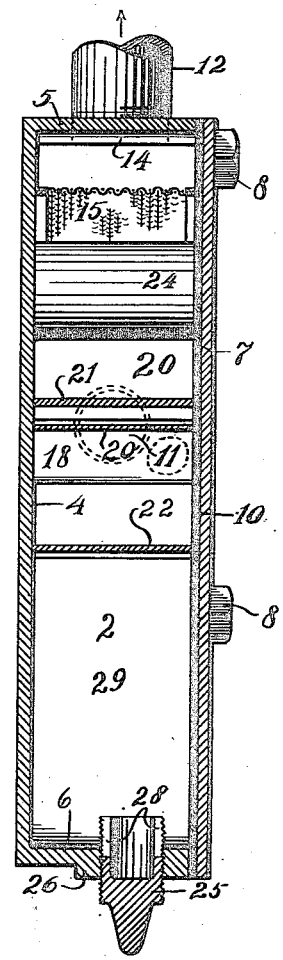

Referring to the drawings:—Figure 1 represents a front elevation of a trap embodying my invention, the cover plate and gasket being removed therefrom; and Fig. 2 represents a longitudinal sectional view of such trap, taken on the line 2—2 of Fig. 1.

In the drawings, 1 designates an elongated casing comprising side walls 2 and 3, a back wall 4, a top wall 5, a bottom wall or closure 6, and a front or cover plate 7. Preferably, the sides, back, top and bottom of the casing are formed in an integral casting and the cover plate is removably secured to said casting by means of bolts 8 extending through said cover plate and threaded into lugs 9 projecting from said casting. A gasket 10 of suitable material, as rubber, is interposed between the cover plate and the casting. The inlet pipe 11 communicates with the casing through the side wall 2, said pipe being screwed into a boss 13 formed on said wall, an outlet 12 being provided for said casing, preferably in the top wall thereof adjacent the side wall 2, said top wall being provided with a boss 14 into which the outlet pipe may be threaded. A screen 15 separates the inlet and outlet, said screen inclining upwardly from the inlet and being secured in place in any suitable manner. As shown, the lower end of said screen may be fitted in the angular recess 16 formed between the boss 13 and the wall 2 and the upper end may be inserted into a groove 17 in the upper portion of the opposite wall 3.

In order to deflect the water toward the outlet and against the screen 15, a baffle plate 18 is provided, extending from the bottom of the boss 13, below the inlet, across said inlet in a direction to intersect the screen. The upper end of the plate 18 is separated from the screen 15, to provide a somewhat restricted passageway between such plate and said screen. A baffle plate 20 extends downwardly from the upper end of the plate 18 toward the wall 3 of the casing, being separated from said wall to form a restricted passageway therebetween. A third baffle plate 21 extends from the casing 3, at a point slightly above the junction of the plates 18 and 20, downwardly toward the plate 20, the lower end of such plate 21 being separated a short distance from the plate 20 to form a restricted passageway therebetween. Below the lower end of the plate 20, a fourth plate 22 is provided, said plate extending slightly downward from the wall 3 to about the longitudinal axis of the casing and being separated a short distance from the lower end of the plate 20 to form a restricted passageway therebetween. All of the above plates are preferably cast with the casing.

Within the chamber 23, formed between the screen 15, the wall 3, and the plates 20 and 21, there is provided a cylindrical boss 24, preferably cast with the casing and extending transversely of the same. This boss provides, in effect, an annular chamber or passageway for the water. The gasket 10 engages the upper edges of the screen 15, plates 18, 20, 21 and 22 and boss 24, preventing the water from passing around the front edges thereof. The lower end of the casing is provided with a pet cock 25, threaded through the boss 26 in the lower end thereof. Said cock is preferably provided with a hollow body 27 having slots 28 therein, whereby, by unscrewing the cock a sufficient distance, the water in the chamber 29 and the sediment therein may be withdrawn through the said slots.

In operation, water enters the trap through the inlet 11, strikes the plate 18 and is deflected upwardly against the screen 15. Some of the water passes directly through said screen on its way to the outlet 12. The greater part, however, follows the upward inclination of the screen and whirls around the annular passageway or chamber provided between the boss 24 and the screen 15, wall 3, plate 21 and plate 20. While water is flowing through the trap, substantially all of the sediment in the chamber 23, owing to its gravity and to the centrifugal action of the water current in said chamber, passes between the plates 21 and 20, into the chamber 30 formed between said plates and the wall 3, through the space between the lower end of the plate 20, wall 3 and plate 22, into the chamber 29. There is some circulation in the chamber 30, owing to the friction between the water in the chamber 23 and that in the chamber 30. The downward inclination of the plates facilitates the deposition of the sediment into the chamber 29. The slight frictional circulation in the chamber 30 serves to keep the plates 20 and 22 clean, depositing the sediment that might otherwise collect thereon into the chamber 29. The provision of the chamber 29, with the plates 20 and 22, effectively prevents any circulation in said chamber 29 below the plate 22 and permits the sediment to drop to the bottom of said chamber, where it remains undisturbed by the rapid circulation in the chamber 23. The result is to quickly separate the sediment from the water and to deposit the former into a dead space wherein it is unsubjected to disintegration by the currents in the freely circulating water in the upper part of the casing, preventing the subdividing of the sediment into particles sufficiently fine to pass into the screen and the solution by agitation of matter that is ordinarily insoluble.

It will be seen that plates 21 and 22 are connected to the side wall 3 and project downwardly therefrom and that plate 18 projects upwardly from side wall 2 and is connected at its upward end with a downwardly inclined plate 20. In starting my device, it will be apparent that, before water is supplied thereto, the casing is filled with air. Some of this air will be retained below plates 21 and 22 and in the triangular space formed beneath the plates 18 and 20. The air cushions thus formed are beneficial in removing sediment from the screen 15 at the time when the valve connected with outlet pipe 12 is closed. At such time, the air contained in the chambers beneath the aforesaid plates, by its cushioning effect, increases the "back lash" against the screen 15 and thus facilitates the removal of sediment therefrom.

Having thus described my invention what I claim as new and desire to secure by Letters-Patent is:

1. In a filter, the combination of a casing having an inlet and an outlet, a screen interposed between said inlet and outlet, means additional to the screen for imparting rotary movement to the water on the inlet side of the screen, and means providing a dead water chamber in said casing on the inlet side of the screen for the reception of sediment, substantially as specified.

2. In a filter, the combination of a casing having an inlet below the top thereof, an outlet through the upper portion thereof, a screen extending between said inlet and outlet and separating the same, and a chamber in the lower portion of said casing communicating with the inlet side of said screen through a tortuous passageway, substantially as specified.

3. In a filter, the combination of a casing having an inlet in the body thereof below the top and an outlet through the upper portion thereof, a screen extending across the casing between the inlet and the outlet, said casing having a chamber extending below and adjacent the screen, a chamber in the lower portion thereof, and a chamber intermediate of the first mentioned chambers and communicating therewith, substantially as specified.

4. In a filter, the combination of a casing having an inlet below the top thereof and an outlet from the upper portion thereof, an upwardly inclined screen extending across said casing from a point above the inlet, an upwardly inclined plate extending from below the inlet toward the screen and having its upper end spaced from said screen, a downwardly inclined plate extending from the upper end of the last mentioned plate toward the wall of the casing opposite the inlet, a plate extending downwardly from the wall of the casing opposite the inlet toward the last mentioned plate and spaced therefrom, and a cylindrical member or boss extending transversely across the casing in the space between the screen and the two last mentioned plates, substantially as specified.

5. In a filter, the combination of a casing having an inlet below the top thereof, an upwardly inclined screen extending across said casing from a point above the inlet, an upwardly inclined plate extending from below the inlet toward the screen and having its upper end spaced from said screen, a downwardly inclined plate extending from the upper end of the last mentioned plate toward the wall of the casing opposite the inlet, a plate extending downwardly from the wall of the casing opposite the inlet and toward the last mentioned plate and having its lower end spaced therefrom, a plate below the last mentioned plates and extending downwardly from the wall of the casing opposite the inlet, and a cylindrical member or boss extending transversely across the casing in the space between the screen and the second and third plates, substantially as specified.

6. In a filter, the combination of a casing having an inlet, an outlet above the inlet, a screen extending from the inlet upwardly across the casing and separating the inlet and the outlet, means for deflecting the water entering the casing upwardly against the screen adjacent the inlet, means for forming an annular passageway for the water adjacent said screen, and means for forming a dead water chamber in the lower part of the casing, said chamber communicating with the annular passageway through a tortuous connection, substantially as specified.

7. In a filter, the combination of a casing having an inlet and an outlet, a screen interposed between the inlet and the outlet, said casing having adjacent the screen an annular passageway for the water, a sediment-receiving chamber below said annular passageway and communicating therewith, and baffle plates interposed between said passageway and chamber to prevent the circulation of water within the latter, substantially as specified.

8. In a filter, the combination of a casing having an inlet and an outlet, a screen interposed between the inlet and the outlet, said casing having adjacent the screen an annular passageway for the water, a sediment-receiving chamber below said annular passageway and communicating therewith, and downwardly inclined baffle plates interposed between said passageway and chamber to facilitate deposition of sediment into said chamber and to prevent circulation of the water within the same, substantially as specified.

9. In a filter, the combination of a casing having an inlet and an outlet, a screen interposed between the inlet and the outlet, said casing having adjacent the screen an annular passageway for the water, a sediment-receiving chamber below said annular passageway, and staggered, downwardly-inclined baffle plates interposed between said passageway and said chamber, substantially as specified.

10. In a filter, the combination of a casing having an inlet and an outlet, a screen interposed between said inlet and outlet, said casing having plates therein dividing the space below the screen into three chambers, said chambers being located respectively adjacent the screen, at the lower end of the casing, and intermediate the lower end of the casing and the screen, substantially as specified.

11. In a filter, the combination of a casing having an inlet through one side thereof and an outlet through the upper portion thereof, a screen interposed between said inlet and outlet and separating the same, said casing having an upwardly inclined passageway between the inlet and the screen, a chamber formed adjacent the wall of the casing which is opposite the inlet, and a chamber in the lower portion of said casing, said passageway and chambers being in communication, substantially as specified.

12. In a filter, the combination of a casing having an inlet below the top thereof and an outlet, a screen separating said inlet and outlet, said casing being provided with a chamber below the screen and adjacent the wall of the casing which is opposite the inlet, a small chamber below and communicating with the first-mentioned chamber and adjacent the wall of the casing which is opposite the inlet, and a chamber in the lower portion of said casing communicating with the last-mentioned chamber, substantially as specified.

13. In a filter, the combination of a casing having an inlet in the side thereof and an outlet in the upper portion thereof, a screen interposed between said inlet and outlet, said screen extending upwardly from the inlet, a deflecting plate extending upwardly from the wall of the casing below said inlet toward the screen and having its upper end separated from said screen to form a passageway therebetween, a chamber in the casing below said screen and beyond said passageway, a chamber in the bottom of the casing communicating with said last-mentioned chamber, and downwardly inclined baffle plates interposed between said chambers, substantially as specified.

14. In a filter, the combination of a casing having an inlet and an outlet, a screen interposed between said inlet and outlet, a sediment receiving chamber within the filter below the said screen, and a plurality of overlapping baffle plates interposed between the inlet and the sediment chamber.

15. In a filter, the combination of a casing having an inlet and an outlet, a screen interposed between the said inlet and the said outlet, a sediment chamber located in the lower part of said filter, a baffle plate within the filter located opposite the inlet and inclined upwardly to direct the entering water toward the screen, and a plurality of overlapping baffle plates interposed between the inlet and the sediment chamber.

In testimony whereof I affix my signature in the presence of two witnesses.

OTTO F. KADOW.

Witnesses:
B. W. BROCKETT,
J. B. HULL.